United States Patent
Fischer

(10) Patent No.: US 7,561,701 B2
(45) Date of Patent: Jul. 14, 2009

(54) METHOD AND APPARATUS FOR IDENTIFYING THE DIRECTION OF INCIDENCE OF AN INCOMING AUDIO SIGNAL

(75) Inventor: Eghart Fischer, Schwabach (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 908 days.

(21) Appl. No.: 10/808,941

(22) Filed: Mar. 25, 2004

(65) Prior Publication Data
US 2004/0240681 A1 Dec. 2, 2004

(30) Foreign Application Priority Data
Mar. 25, 2003 (DE) .................... 103 13 331

(51) Int. Cl.
H04R 3/00 (2006.01)
H04R 5/00 (2006.01)
H04R 25/00 (2006.01)

(52) U.S. Cl. .................. 381/92; 381/26; 381/313
(58) Field of Classification Search .............. 381/92, 381/26, 313; 367/126; 369/126
See application file for complete search history.

(56) References Cited

U.S. PATENT DOCUMENTS 6,069,961 A * 5/2000 Nakazawa .............. 381/92

6,339,758 B1  1/2002  Kanazawa et al.
6,584,203 B2 * 6/2003  Elko et al. .............. 381/92
2001/0007969 A1  7/2001  Mitzushima
2002/0048376 A1  4/2002  Ukita

FOREIGN PATENT DOCUMENTS

DE  199 27 278  12/2000
WO  WO 03/009636  1/2003

OTHER PUBLICATIONS

Patent Abstracts of Japan Publication No. 07260916 for Japanese Application 06076659, Oct. 13, 1995.

\* cited by examiner

*Primary Examiner*—Vivian Chin
*Assistant Examiner*—Douglas J Suthers
(74) *Attorney, Agent, or Firm*—Schiff Hardin LLP

(57) ABSTRACT

To determine the direction of incidence for a signal from an acoustic signal source using a directional microphone system, which has at least two microphones, two or more directional microphone signals are produced, each having a direction-dependent sensitivity distribution with a minimum in one direction. The directional microphone signals are assessed with regard to a quantity to determine the directional microphone signal which is most influenced by the associated direction dependent sensitivity distribution. The direction of incidence is determined as being the direction in which the minimum of the sensitivity distribution of this directional microphone signal is located.

27 Claims, 6 Drawing Sheets

FIG 7
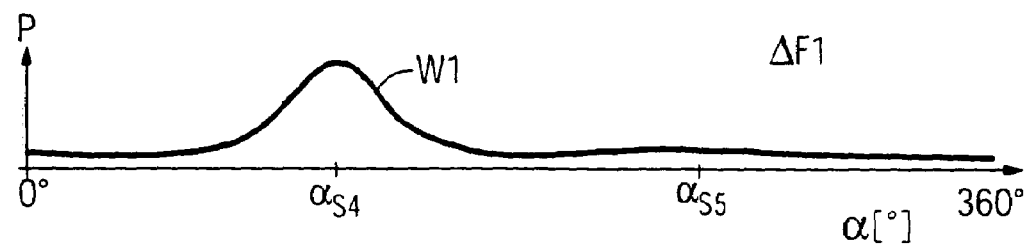
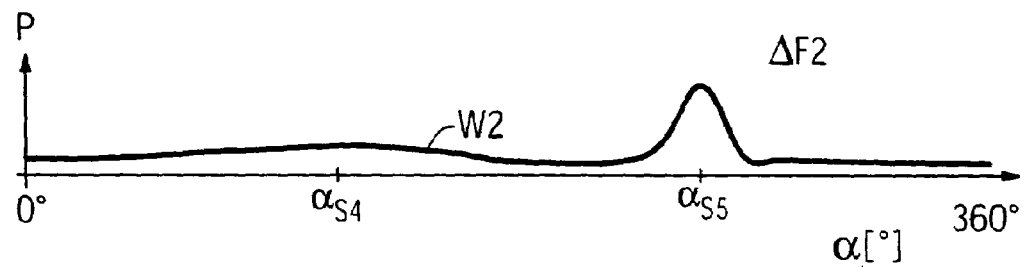
FIG 8
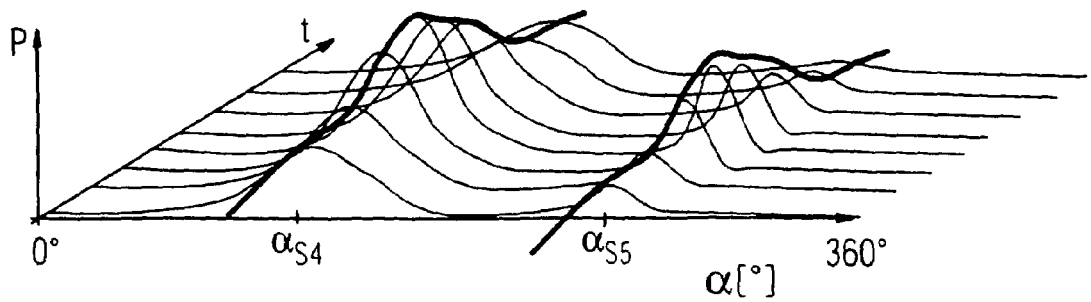

METHOD AND APPARATUS FOR IDENTIFYING THE DIRECTION OF INCIDENCE OF AN INCOMING AUDIO SIGNAL

BACKGROUND OF THE INVENTION

1. Field of the Invention

The present invention relates to a method for determining the incidence of a signal from an acoustic signal source using a directional microphone system, which has at least two microphones, and to an apparatus for implementing the method.

2. Description of the Prior Art

For various acoustic signal-processing algorithms, it is necessary to know the direction of incidence of an incoming signal. This is important, for example, in the case of controllable directional microphone systems which allow interference signals to be deliberately suppressed. For this purpose, for example, microphones in a directional microphone system are optimized with regard to the direction of incidence by a matching process in such a way that they eliminate the interference signal component in the directional microphone signal as much as possible.

Furthermore, localization and frequency determination are important for acoustic scene analysis (Auditory Scene Analysis, ASA). In an analysis such as this, for example, an angle at which a signal is incident, a frequency of the signal or else a distance from the signal source are determined.

Various methods, which are based on correlation analysis between microphone signals, which have been delayed for different periods, exist for determination of the direction of incidence. The direction of incidence is estimated as a function of the correlation and of the geometry of the microphones. These methods, however, are rather unsuitable for small microphone separations, such as those for single ear headsets since, in this case, the maximum delay time between two microphones is typically less than one sampling period. If the sampling rate is 20 KHz sound is returned in a sampling period of about 17 mm. These methods are inaccurate for typical microphone separations in directional microphone systems of 8 to 12 mm.

In addition, so-called head-related transfer functions (HRTFs) come into play, for example when using the directional microphone in a hearing aid that is worn on the head. These corrupt the result of the direction estimation for the localization of the signal source in comparison to the situation of a directional microphone that is used in the open air and is not acoustically influenced by the environment. A further disadvantage of direction estimation with two or more microphones arranged on one axis is that the direction cannot be determined unambiguously in the open air, since there is always a symmetrical result about the microphone axis. This means that an estimate of the direction of incidence such as this is not unambiguous.

A method for matching microphones in a hearing aid, as well as a hearing aid operating according to the method, are known from German PS 199 27 278. In this case, a hearing aid with two or more microphones which are connected to one another in order to produce a directional characteristic is ensonified while being worn in a suitable measurement area, and the directional characteristic is recorded. Filter parameters which result from this can be supplied to configurable filters which are connected downstream from the microphones and it is thus possible to approximate the desired ideal directional characteristic taking account of the individual characteristics when the hearing aid is being worn. This method allows filter parameters to be produced for amplitude and phase response matching of signals recorded by the microphones, in order to optimize the directional characteristic of the microphones.

SUMMARY OF THE INVENTION

An object of the present invention is to provide a method and an apparatus by means of which the incidence angle of an acoustic signal can be determined.

The above object is achieved according to the invention by a method for determining the incidence of a signal from an acoustic signal source using a directional microphone system which has at least two microphones, wherein two or more directional microphone signals are produced by weighted combination of the respective signals from the two microphones, with the weighting in each case determining a direction dependent sensitivity distribution of the directional microphone signal and the sensitivity distribution having a minimum in one direction, with each directional microphone signal being assessed on the basis of a quantity which indicates the influence on the respective directional microphone signal from the associated direction-dependent sensitivity distribution. That directional microphone signal is then determined, comparison among the two or more directional microphone signals that has an extreme (maximum or minimum) value of the aforementioned quantity. The direction of incidence finally is determined to be that direction in which the minimum of the direction-dependent sensitivity distribution of this directional microphone signal is located. In the case of weighted combination, it is possible, for example, to achieve a delay with the aid of a phase factor and an amplitude change by an amplitude factor.

The underlying basis of the method for determination of a direction of incidence is the production of two or more directional microphone signals. In this case, the directional microphone signals each have different direction dependent sensitivity distributions, each with a minimum in one direction. If a signal source is located in the direction of the minimum, the reception of the directional microphone system is not as sensitive as the reception of a signal from a signal source which is in a direction of maximum sensitivity.

In comparison with the case of a maximum, it is generally simpler to restrict a sensitivity minimum to a relatively small range of different directions. In a sensitivity distribution, which is also referred to as a directional characteristic, it is thus possible in a corresponding manner to achieve a more narrowly localized section of the sensitivity. This is the case, for example, when producing a first order directional characteristic with two microphones, which has relatively broad first order directional lobe and narrow minima.

An important factor for the method is the choice of the quantity that indicates the influence on the respective directional microphone signal from the associated direction dependent sensitivity distribution. The signal energy, as an example, may be used for this assessment. Alternatively, it is possible to determine the signal level, a voltage produced from the signal, a magnitude of the signal, a signal-to-noise ratio of the directional microphone signal, or the reciprocals of these variables including the reciprocal of the signal energy. One precondition for a suitable variable is that it is influenced directly by the directional characteristic.

If the influence of the sensitivity distribution, in particular the influence of the minimum, on the measure is known, the individual directional microphone signals can be assessed on the basis of the measure. If a comparison is then also carried out within the two or more directional microphone signals, for example by producing a ranking list on the basis of the degree to which they are influenced, then it is possible to determine that directional microphone signal which is most influenced, that is to say the one which is assessed with an extreme value. A directional microphone signal such as this has, for example, minimum signal energy.

The direction of incidence of the signal is given by the direction of the minimum in the sensitivity distribution which is associated with the directional microphone signal that is assessed to have the extreme value. An unambiguous minimum is accordingly a precondition for an unambiguous association.

An unambiguous sensitivity minimum which occurs in only one direction is dependent on an asymmetric sensitivity distribution. Directional microphone systems are normally used in asymmetric acoustic environments. For example, the influence of a head on a directional microphone which is installed in a hearing aid results in sensitivity asymmetry by virtue of its directional characteristic.

In the open air, in contrast, only symmetrical sensitivity distributions can be produced which reflect the symmetry of the open-air environment and the microphone arrangement and which thus may also have two or more directions for a minimum. However, for example, two or more combinations of at least three microphones in pairs can be used for such an ambiguous situation, in order to ensure that the method is unambiguous. In this case, as an example, ambiguity is avoided using a combination of two symmetrical directional characteristics.

In an embodiment of the method, the quantity is the energy in the directional microphone signals and the direction of the minimum of that sensitivity distribution which has the least directional microphone signal energy is determined to be the direction of incidence. This has the advantage that the measure, in this case the energy, is easily accessible since it is available, for example, as the voltage value of the signal level of the directional microphone signal, taking account of any offset.

In another embodiment, the quantity is the reciprocal of the signal energy of a directional microphone signal, which indicates a probability with which the direction of the minimum of the corresponding sensitivity distribution is the direction of incidence of the signal. This probability-oriented determination of the direction of incidence is particularly advantageous when two or more signals are present from different direction of incidences. The probabilities of the directions associated with the directional microphone signals can advantageously be combined in the evaluation process to form a direction resolved probability distribution. In a probability distribution such as this, the probability of a signal being received from one direction is plotted against the measured directions which are determined, for example, in the form of incidence angles.

The method is based on the capability to determine the sensitivity of the directional microphone system by a weighted combination of the signals from the microphones in the directional microphone system. There are various possible ways to match microphones in a directional microphone system to one another, i.e., to say to combine their signals in a weighted form.

In an embodiment of the method, the weighting is determined such that it minimizes the sensitivity of the directional microphone system for a signal source which is in one direction with respect to the directional microphone system. The more precisely the sensitivity minimum can be placed in one direction the more accurately signals can be detected on a direction resolved basis from localized signal sources.

In another embodiment of the method, the weighting is determined by taking into account an effect of the acoustic environment which occurs as a result of the use of the directional microphone system. For example, the weighting in the case of a directional microphone system which is used in a hearing aid is determined with the hearing aid being worn. This means that the directional microphone system is arranged on a head or on a head imitation in a constellation corresponding to use when determining the weighting. One advantage of this embodiment is that it avoids ambiguities in the determination of the direction of incidence in that the influence of the head is taken into account, for example, by including the HRTFs in the method, and in that the asymmetry which is induced in the directional microphone system by the head is used deliberately. It is thus also possible to measure the direction of incidence on the basis of true angles.

In order to determine a weighting, for example, a signal source which is located in one direction with respect to the directional microphone system is removed from the directional microphone signal as well as possible by varying the weighting of the microphone signals. The weightings determined in this way have the advantage that they are in each case produced optimized with respect to the direction of incidence of the signal source, in controlled conditions with fine subdivisions.

In a further embodiment of the invention, the weighting has an amplitude factor and a phase factor in particular for correction of the amplitude or phase, respectively, of one of the microphone signals. The weighting, for example in the form of the amplitude and phase factor, may be stored, with the storage process being carried out, for example, in the form of frequency dependent and direction dependent families of characteristics. The various weightings can be read selectively from the memory in order to produce the directional microphone signals.

In one particularly fast-operating embodiment of the method, the various directional microphone signals are essentially produced at the same time.

In another embodiment, the value of the weighting is changed when producing the two or more directional microphone signals, in order to successively produce directional microphone signals with different direction dependent sensitivities. This has the advantage that there is no need to calculate a large number of directional microphone signals simultaneously.

In a further embodiment of the method, the frequency range of the microphone signals is subdivided into frequency intervals, with the method being carried out in each of these intervals. In this case, the directional microphone signals are assessed on the basis of the measure of the influence in the various frequency bands. This means, for example, that it is also possible to investigate the correlation between two signal sources which are located in different direction of incidences and in different frequency bands. For example, if the signals are correlated in time, it will be possible, for example, for both signals to originate from one physical source, with one of the signals being received at a different direction of incidence in a different frequency range, owing to a reflection on a moving object (echo relationship). A correlation analysis such as this can also be carried out for two or more signal sources in one frequency band in order, for example, to identify echo relationships without any frequency shift.

The above object also is achieved by an apparatus for implementing a method as described above, wherein the apparatus has a directional microphone system with at least two microphones.

In one embodiment, the two microphones are connected to respective filter banks in order to subdivide the microphone signals into frequency bands, so that frequency band signal components of the microphone signals are produced at the outputs of the filter banks. The outputs of the respective filter banks with the same frequency bands are connected in pairs to a unit which combines the frequency band signal components using a weighting. The weighting is produced by amplitude units, which vary the amplitude of the corresponding frequency band signal component, and by means of phase units which shift the phase of the corresponding frequency band signal component. The amplitude units and the phase units act either jointly on one or individually on each of the frequency band signal components. The amplitude units and the phase units are connected to an assessment unit, which assesses the directional microphone signals on the basis of a quantity for the aforementioned influence, and uses this to determine an direction of incidence for a signal from a signal source.

DESCRIPTION OF THE DRAWINGS

FIG. 7 shows two probability distributions in two frequency bands.

FIG. 8 shows a correlation analysis of a probability distribution with two signals.

DESCRIPTION OF THE PREFERRED EMBODIMENTS

Figure 1:
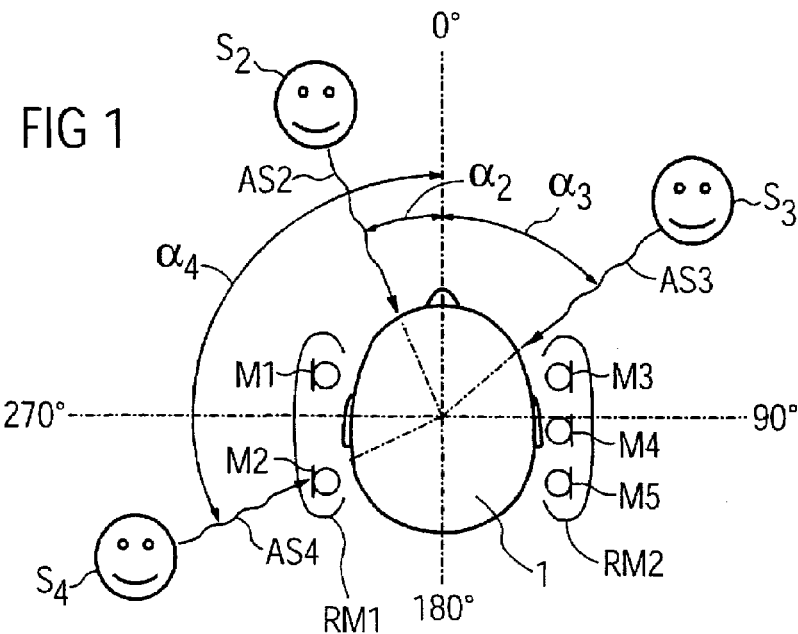
FIG. 1 shows a typical example of the use of a directional microphone system for suppression of acoustic interference signals.

FIG. 1 shows a typical example of the use of a directional microphone system RM1, RM2 for the determination of a direction of incidence of an acoustic signal. In this case, one or more directional microphone systems RM1, RM2 are located in a hearing aid which is worn as such by the person 1. The person 1 is having a conversation with the people S2, S3, S4 who are located in different directions with respect to the person 1. As an example, the difference between the position of the person S2 and the 0° axis is the angle $\alpha 2$ within a conical directivity area of the directional microphone system RM1.

The people S3, S4 are located at angles of $\alpha 3$, and $\alpha 4$, respectively, with respect to the 0° axis. In order to produce an ASA, the signal sources of the acoustic signals AS2, AS3, AS4 should be localized, that is to say the direction of incidences of the signals AS2, AS3, AS4 should be determined by one of the directional microphone systems, RM1, RM2.

The directional microphone system RM1 comprises two microphones M1, M2; the directional microphone system RM2 comprises three microphones M3, M4, M5. The hearing aids which contain the directional microphone systems RM1, RM2 may be hearing aids which are worn behind the ear or in the ear. Alternatively, further directional microphone systems can be produced by connecting the microphones M1, M2 on one side to one or more microphones M3, M4, M5 on the other side.

In order to form a directional microphone signal, the signals from at least two microphones M1, . . . M5 are combined with one another, possibly with a delay and weightings. The directional microphone system has a different direction-dependent sensitivity, depending on the weighting.

A sensitivity distribution such as this is referred to as a directional characteristic of the directional microphone system, and may be measured, for example, as follows. An acoustic signal at a constant amplitude is applied to the directional microphone system, with the source of the acoustic signal being able to move around the directional microphone system. The received signal energy is recorded for different directions, that is to say for different positions of the signal source, and varies for the same weighting owing to the direction-dependent sensitivity of the directional microphone system.

A weighting for a specific sensitivity to a signal source which is located in one direction can be determined with the aid of a similar procedure. In this case, the weighting is varied rather than the direction in which the signal source is located. The sensitivity of the directional microphone system is in this case, for example, set such that the signal which is received by the directional microphone system from a constant direction is, for example, received at a minimal level or is even entirely eliminated. If this process is repeated for a number of directions, that is to say the position of the signal source is rotated for example in 5° angle steps around the directional microphone system, then a set of weightings is produced, which each minimize one signal arriving from the corresponding direction.

Directional characteristics which are measured in the open air by two microphones are symmetrical with respect to an axis which is defined by the connecting line between the two microphones. However, directional microphone systems are in each case used in a specific acoustic environment, for example they are worn on the head as in FIG. 1, or on the body. The acoustic environment influences the sound propagation and, in a corresponding manner, the directional characteristics. For this reason, it is advantageous to use the weighted combination to produce the directional characteristics used in the method in the respective acoustic environment, so that the weightings take account of the effect of the acoustic environment on the acoustic signals.

Where a directional microphone system is installed in a hearing aid, in addition to the capability to match the microphones to the head of the respective hearing aid wearer, that is to say to combine them in a weighted manner, it is also possible to match them with the aid of a head imitation which, for example, represents an average head.

The influence of the head on the propagation of sound waves which are intended to be received by a microphone worn on the head is determined by the so-called head-related transfer functions (HRTF). HRTFs such as these may be determined, for example, using the procedure that has already been described, which allows weightings to be calculated which likewise lead to directional microphone signals with direction-dependent sensitivities.

Figure 2:
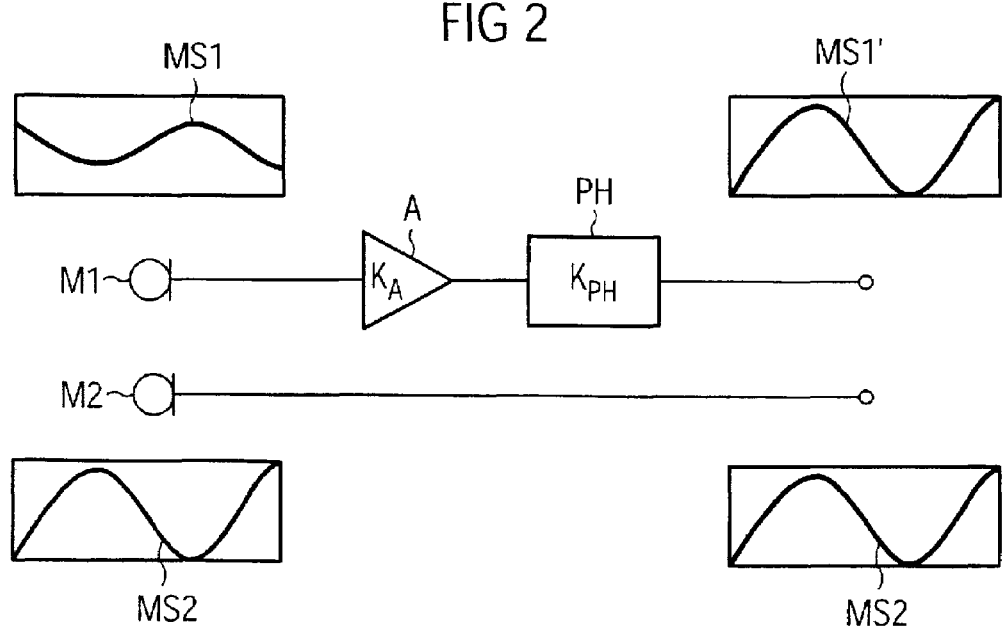
FIG. 2 shows the procedure for matching two microphone signals.

FIG. 2 shows, schematically, the weighted combination of two microphone signals MS1, MS2 from the microphones M1, M2. The signals MS1, MS2 differ in their amplitude and in their phase. The aim of matching the two microphones is firstly to match the amplitudes of the signals MS1, MS2 and secondly to set a fixed phase relationship. The former is achieved, for example, by amplification with a fixed amplitude factor $K_A$ in an amplifier unit A. The latter is achieved, for example, by a phase shifter PH, which shifts the relative phase, which should be 0° in FIG. 2, through the phase angle $K_{PH}$.

The amplitude and phase correction may act on a microphone signal. This is the situation in FIG. 2: both correction factors act on the microphone signal MS1 and produce a corrected microphone signal MS1'. This has the obvious advantage of a simple design, in which only one signal is processed. Alternatively, the corrections may each act on one of the microphone signals.

Signal matching such as this preferably is carried out in one frequency band. For this purpose, the frequency range of the microphone signals is subdivided into two or more frequency bands, for example with the aid of a filter bank. The amplitude and phase factors $K_A$, $K_{PH}$ now themselves determine the direction-dependent sensitivity of the respectively produced directional microphone system in that, for example, they minimize the sensitivity in the corresponding frequency band in one direction. An unambiguous association between a minimum and a direction is possible only in the case of an asymmetric sensitivity distribution, such as that which results from the influence of the head. In contrast, only symmetrical sensitivity distributions can be produced for the open air, which reflect the symmetry of the open-air environment and of the microphone arrangement.

The frequency-dependent and/or direction-dependent weightings for the method are stored in the form of frequency-dependent and/or direction-dependent characteristics or functions, or as data pairs, in the directional microphone system.

Figure 3:
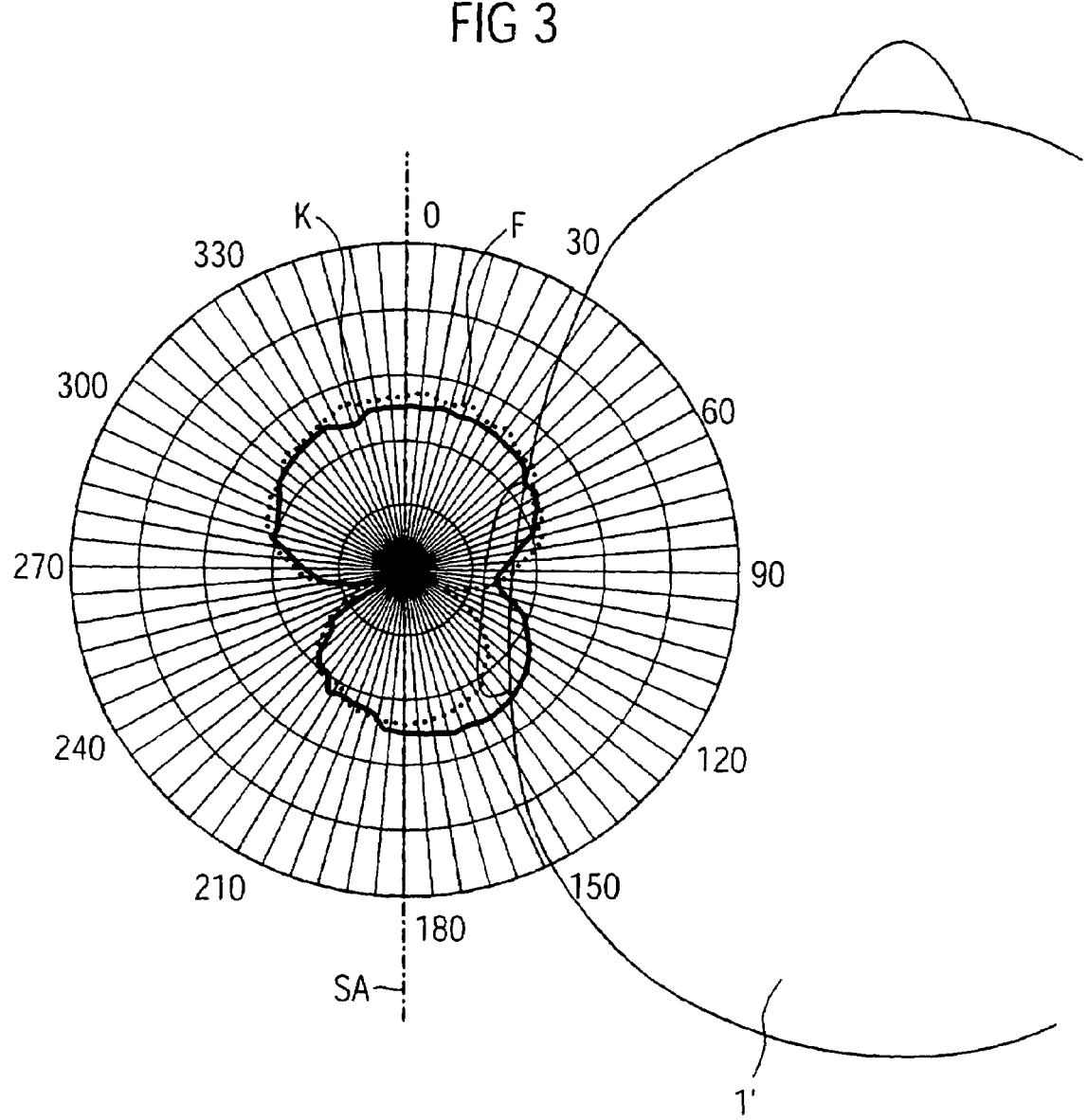
FIG. 3 shows a sensitivity distribution for a directional microphone system which has been matched for open air, as well as a sensitivity distribution taking account of the head influence.

FIG. 3 shows two measured directional characteristics, with the sensitivity, which is essentially proportional to the signal energy, being plotted radially against the angle from 0 to 360° in 5° steps.

Firstly, a directional characteristic F is shown in the open air for an acoustic signal at 500 Hz. This clearly shows its symmetrical profile around the axis of symmetry SA which is produced by the connecting line between the directional microphones. Owing to the symmetry, the directional characteristic has two minima in the 120° and 240° directions.

In addition, FIG. 3 shows a directional characteristic K which takes account of the influence of an indicated head 1' on the direction-dependent sensitivity of the directional microphone system. This clearly shows the clearly pronounced minimum at 240°. The minimum on the side of the head 1' is less pronounced than that in the open air. A directional microphone system whose weighting results in the directional characteristic K will receive a signal from the 240° region considerably attenuated.

Figure 4:
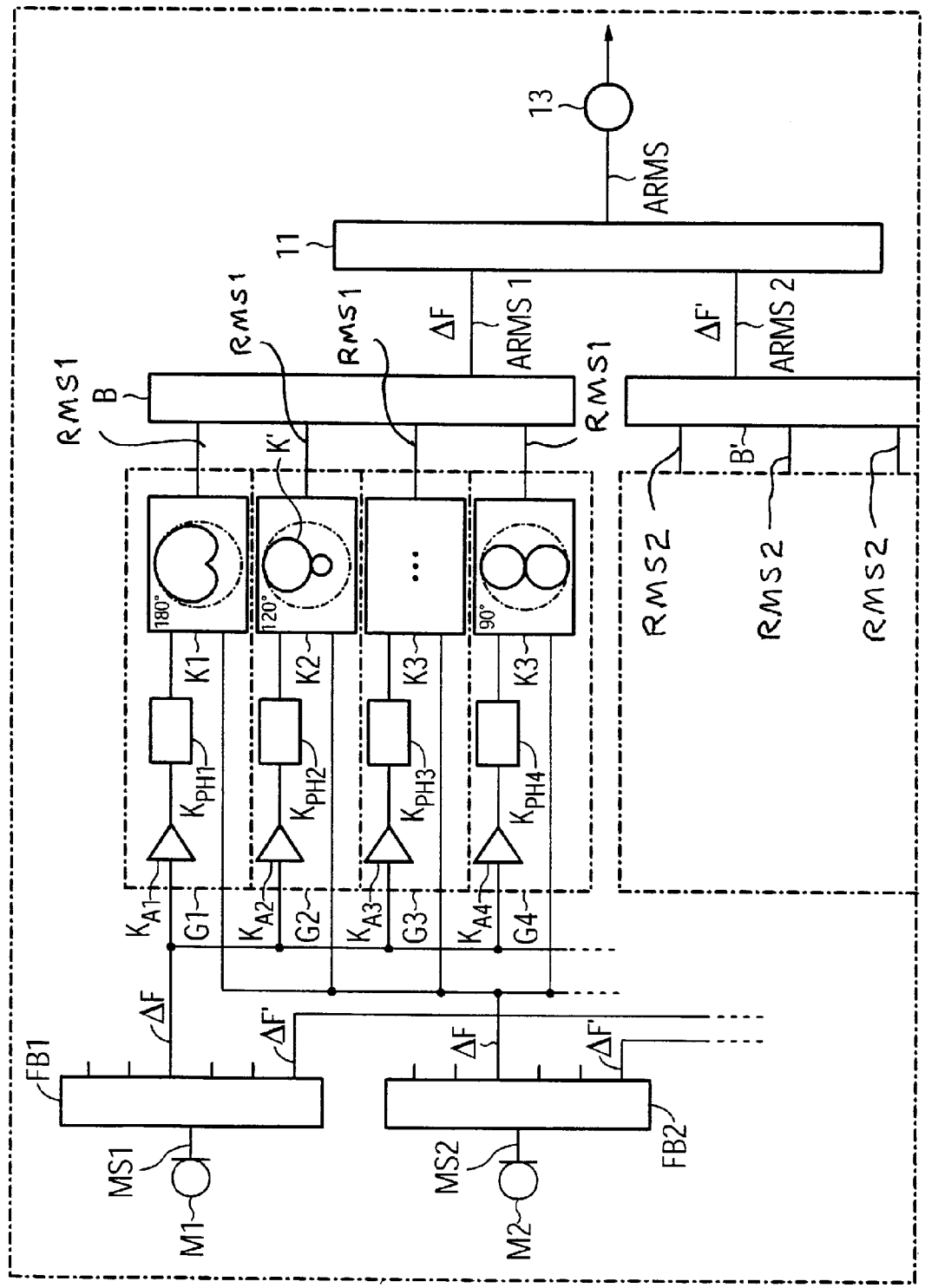
FIG. 4 is a schematic block diagram of an apparatus for implementing the method for suppression of at least one acoustic interference signal, in accordance with the invention

FIG. 4 shows, schematically, an example of a design of an apparatus for carrying out the method. The microphones M1, M2 are connected to a respective filter bank FB1 or FB2. A frequency band $\Delta F, \Delta F'$ of the microphone signals MS1, MS2 is produced at the respective outputs of the filter banks FB1, FB2. Outputs with a matching frequency band $\Delta F, \Delta F'$ are connected in pairs to a series of units G1, G2, G3, G4, which are combined with different weightings. This means that the microphone signal MS1 which is restricted to the frequency band $\Delta F$ and the microphone signal MS2 which is restricted to the same frequency band $\Delta F$ are available for weighted combination.

The microphone signal MS1 is in each case matched to the signal from the microphone M2 in the combining units G1, G2, G3, G4 with different weightings with the aid of an amplitude factor $K_{A1}, K_{A2}, K_{A3}, K_{A4}$ and a phase factor $K_{PH1}, K_{PH2}, K_{PH3}, K_{PH4}$. The directional microphone signals RMS1, RMS2 are produced, for example, by forming the difference between the corrected microphone signal MS1 and the microphone signal MS2 in the combination units K1, K2, K3, K4. The corresponding directional characteristics K' are indicated schematically in the combination units K1, K2, K3, K4 for illustrative purposes. The figure also shows the direction in which the minimum of the directional characteristic is located, for example the minimum for K' being at 120°.

The outputs of the combining units G1, G2, G3, G4 with different weightings are connected to an assessment unit B for the frequency band $\Delta F$. The assessment unit B compares the "candidate" directional microphone signals RMS1 with respect to a quantity which measures the influence of the respective directional characteristic on each directional microphone signal RMS1. By way of example, the signal level, the signal energy, the noise component in the signal or the reciprocal of the signal energy, that is to say the probability, may be used as an assessment measure. The "candidate" directional microphone signals RMS1 assessed in this way are compared with one another, and the directional microphone signal ARMS1 is determined whose assessment has an extreme value, that is to say, for example, has a minimal signal energy on the basis of the signal energy in the assessment, or has the maximum probability in the assessment of the probability. The direction of the minimum of the directional characteristic of this directional microphone signal is the direction of incidence of a signal source in this frequency band $\Delta F$. This assessed directional microphone signal is supplied to an analysis unit 11. Alternatively, for example, it is possible to transmit the probabilities for all of the directions investigated using the measured directional microphone signals from the assessment unit to the analysis unit 11.

An analogous procedure is used in all the other frequency bands, as schematically shown for frequency band $\Delta F'$ for which ARMS2 is produced from "candidate" directional signals RMS2. In this case, specific amplitude and phase factors are used for the weighted combination.

The analysis unit 11 evaluates the direction of incidences which are determined in the various frequency ranges, tests their consistency, and attempts, for example, to identify echo signals.

The result ARMS from the analysis unit 11 is supplied, for example, to a signal processing unit 13, for example hearing aid signal processing. This uses the analysis results to control an algorithm for interference signal suppression, or amplifies the respectively desired signal on the basis of the hearing damage of the wearer.

The method which is illustrated in FIG. 4 is based on the processing of microphone signals in the individual frequency bands $\Delta F, \Delta F'$. Alternatively, the microphone signals MS1, MS2 may be analyzed by means of a Fast Fourier Transformation (FFT), and the method may be applied in a corresponding manner to the FFT coefficients.

In the case of the successive production of the directional microphone signals as mentioned above, the assessment unit B may, for example, influence the step width in the relevant direction range even during the production process, thus adaptively acting on the weightings of the two or more directional microphone signals RMS1, RMS2.

Figure 5:
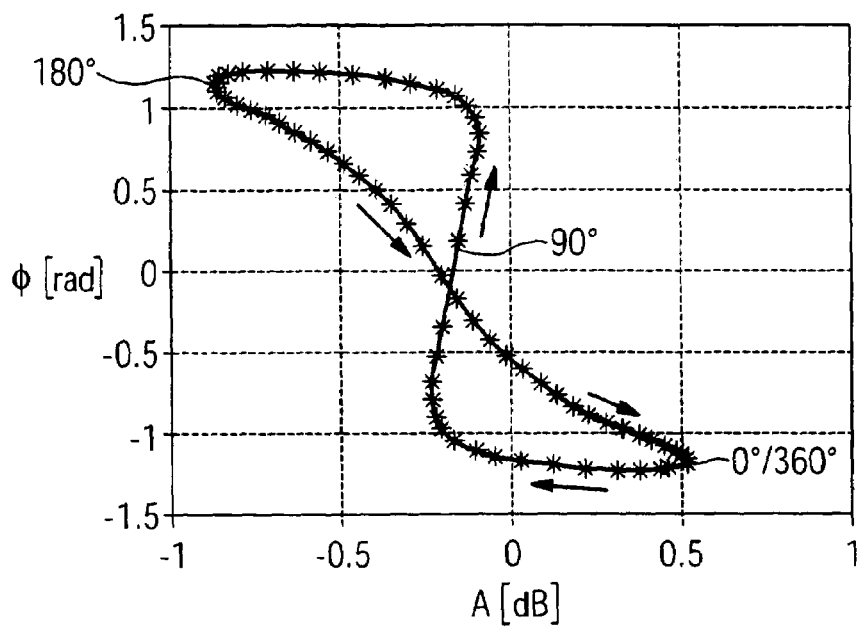
FIG. 5 shows a combined illustration of amplitude and phase factors in the 400 Hz frequency band for 5° angle steps.

FIG. 5 summarizes examples of values of the amplitude and phase factors for one frequency band. The amplitude factor A is plotted in one direction, and the phase delay Φ of the two microphone signals is plotted in the other direction. The amplitude factor A is, for example, about 0.5 dB for 0° or 360°. The associated phase factor Φ is about −1.2. Each small star corresponds to one pair of amplitude and phase factors A, Φ, which are shown in 5° steps. This clearly shows the asymmetric profile of the factor distribution resulting from the head being taken into account in the sound propagation.

Figure 6:
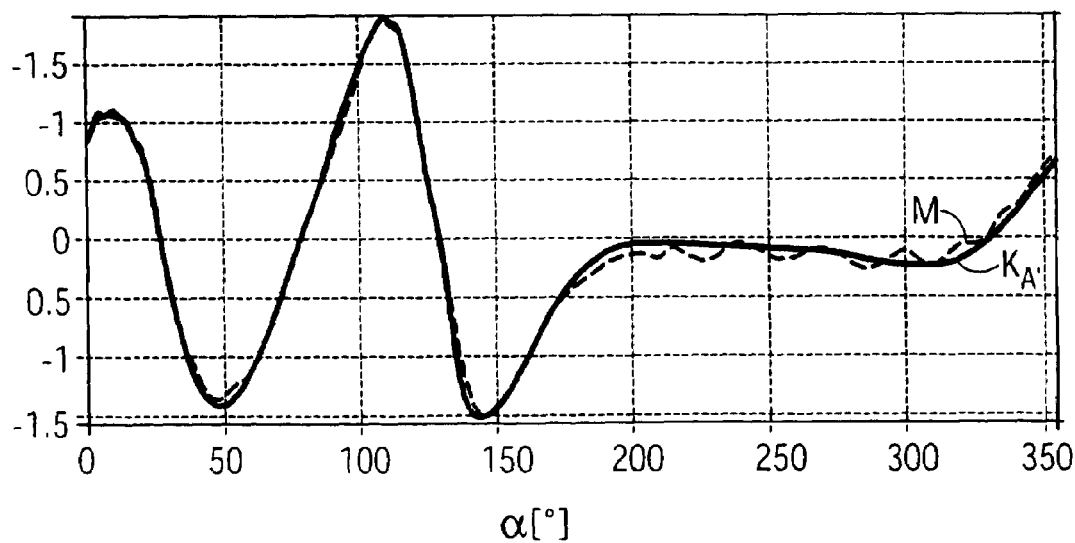
FIG. 6 shows a direction dependent characteristic for an amplitude factor.

FIG. 6 shows an illustration of an amplitude factor A' as a characteristic $K_{A'}$, which approximates the directional dependency of an amplitude factor A'. On the one hand, this shows a structured measurement curve M of the amplitude factor A'. The measurement curve was recorded, by way of example, using the procedure as described above for matching the direction-dependent sensitivity, and describes the amplitude factors which produce minimum sensitivity in the directions α from 0° to 360°. The characteristic $K_{A'}$ essentially reproduces the measurement curve, and is stored in the directional microphone system. Alternatively, the characteristic $K_{A'}$ could be calculated from the HRTFs.

One particularly advantageous procedure for determination of an direction of incidence of an acoustic signal on a directional microphone system, for example of a hearing aid, is carried out, by way of example, as follows by means of the method according to the invention. Frequency-dependent and angle-dependent weightings are used in this case, which additionally also taking into account the influence of the head on the sound propagation.

The output level of two or more first order static directional characteristics which point in all directions around the head is measured simultaneously for each of a number of frequency bands. If a source is active in one frequency band, the minimum of that directional characteristic with the lowest output level points in the direction of that source.

The influence of the head must be taken into account in order to ensure that the angle can actually be deduced from the index of the directional characteristic. This is done by each directional characteristic to be evaluated being modified by measurement on the head or calculation from the HRTFs for each frequency band and angle such that an ideal unambiguous minimum actually occurs in the predetermined direction on the head. This modification is carried out by using a suitable delay and gain factor for each calculated minimum.

This procedure makes it possible to measure the true angle of the sound direction of incidence by inclusion of the HRTFs in the localization process. Furthermore, an estimate in the sound direction of incidence which, in contrast to the open air, is unambiguous, can be made by making use of the asymmetry which is induced by the head. The sound incidence angle can be measured in a robust manner by multiple measurements with a number of microphones combined in pairs.

The advantage of this procedure is that it avoids ambiguities in the localization process (direction of incidence determination) in that the influence of the head is taken into account for example by inclusion of the HRTFs in a localization algorithm, and the asymmetry which is induced into the directional microphone system by the head is used deliberately.

FIGS. 7 and 8 show the possible ways to analyze the measured probabilities P of the direction of incidences. FIG. 7 shows two possible measured probability distributions W1,W2 in two frequency bands ΔF1,αF2. The probability distributions W1 have a pronounced maximum at an angle $α_{S4}$, and the probability distributions W2 have a pronounced maximum at an angle $α_{S5}$. In addition, a slightly indicated maximum can be seen at each of the angles $α_{S5}$ and $α_{S4}$. The maxima indicate a source at the angle $α_{S4}$ in the frequency band ΔF1, and a source at the angle $α_{S5}$ in the frequency band ΔF2, with each of the sources also emitting in a different frequency band, even if this is only very weak.

The probability P is proportional to the reciprocal of the energy. It would also have been possible to measure just the signal energy in the frequency ranges in order to determine the direction of incidences, with the minima of the signal energy likewise indicating the incidence angles $α_{S5}$ and $α_{S4}$. However, the representation in the form of a probability distribution also offers information such as the width of the distribution of the maximum or the ratio of the maximum value to the background. The width may be used, for example, to deduce the distance to the source.

FIG. 8 shows a correlation analysis of a probability distribution with two signals, in the form of their time profile plotted against the time t. This clearly shows how the probabilities P increase and decrease synchronously in time for the two signal sources. The time correlation of the signals shows that the two signals originate from the same source. The weaker signal at the angle $α_{S5}$ could, for example, be an echo of the other signal, which is received by the directional microphone system after being reflected.

Alternatively, the two signal sources could have been detected in different frequency bands. The correlation analysis would then be carried out, for example, on the basis of the added probability of the two frequency bands. The frequency shift of the echo signal could then have been caused by a reflection of a moving object.

If a number of microphones M1, . . . M5 are combined to form a directional microphone system, higher-order directional characteristics can also be produced, whose structures can be matched to more differentiated distributions of interference signal sources.

Figure 9:
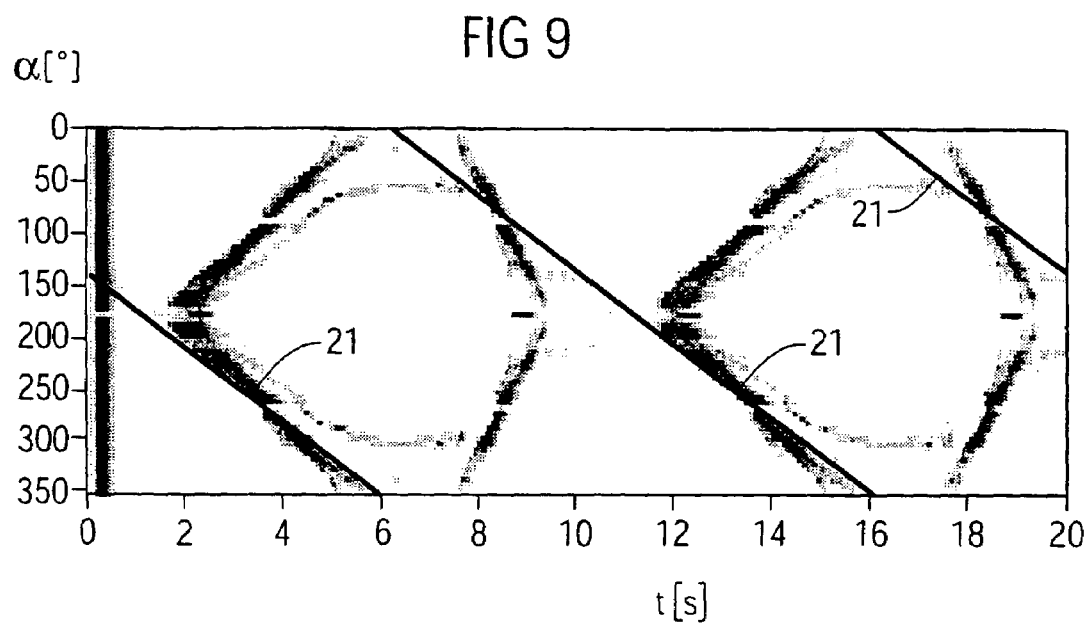
FIG. 9 shows a result of the localization of a moving signal source without any compensation for the head effects.
Figure 10:
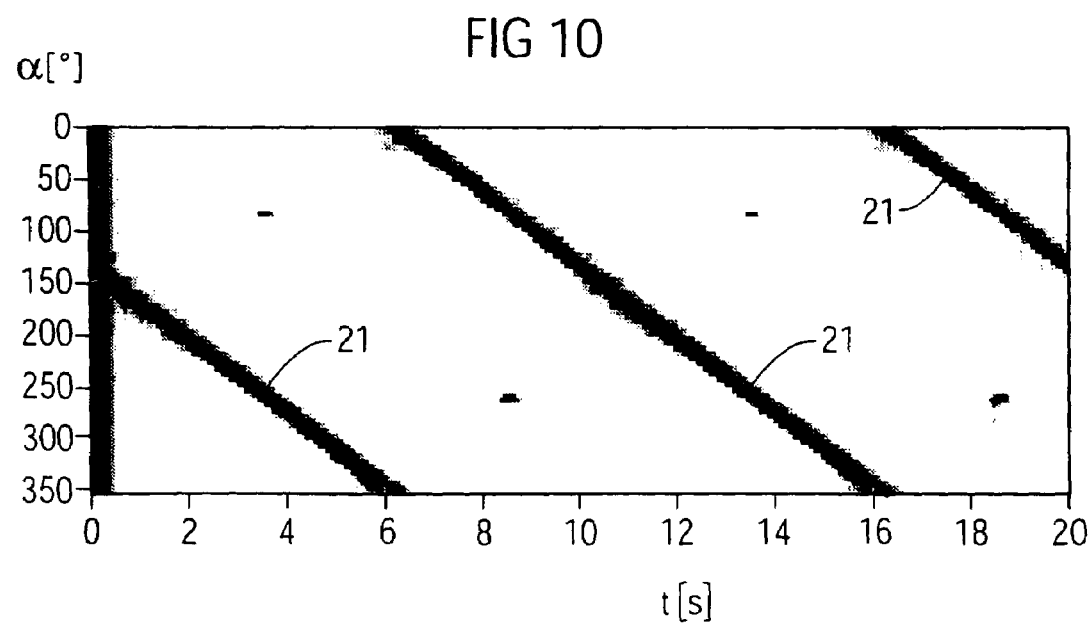
FIG. 10 shows a result of the localization of a moving signal source with compensation for the head effects.

FIGS. 9 and 10 show the influence of the head effect on the result of the localization process for a signal source which is moving around the head at a constant speed, on the basis of a simulation with real data, that is to say with data which has been obtained from measurements in an area with little reverberation. The probabilities of the direction of incidences are determined over several seconds by means of the method for determination of the direction of incidence.

FIG. 9 shows the result for the situation where the head effect is ignored. The probability of the signal being received from the rotating signal source at an angle α from 0° to 360° is plotted against the time t. The darker the gray tone, the higher is the probability. The true profile of the signal source is shown by a black line 21.

Primarily, this shows the symmetry resulting from the two symmetrical minima. The method therefore does not make it possible to distinguish between the two halves from 0° to 180° and from 180° to 360°, that is to say the localization is ambiguous. Furthermore, the true position and the most probable position of the signal source as determined by the method, as given by one of the minima on the side which is not shadowed by the head, at least roughly match.

FIG. 10 shows the result for the situation where the head effect is compensated for. This clearly shows the good match between the true position and the position as determined by the method, which is in this case unambiguous, for all incidence angles from 0° to 360°. In comparison to FIG. 9, FIG. 10 shows that the measurement of the incidence angle probabilities is more precise, since the probability distributions have a sharper profile and have no secondary maxima except for those at 90° and 270°. The ambiguity which occurs at 90° and 270° can be explained by the associated directional characteristics. Even taking the head effect into account, these are essentially very similar due to the back-to-front symmetry of the head, so that the method cannot distinguish between them in this case.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for determining the direction of incidence of an incoming audio signal from an acoustic source to a directional microphone system, having at least two microphones, comprising the steps of:

detecting said incoming audio signal with said at least two microphones and, in each of said at least two microphones, producing an output microphone signal therefrom;

generating at least two phase-shifted directional microphone signals by phase shifting at least one output microphone signal relative to another output microphone signal and combining the phase-shifted output microphone signals with respective weightings, the respective weightings defining a direction-dependent sensitivity distribution, having a minimum in one direction, for the respective directional microphone signals;

assessing each of said directional microphone signals with respect to a quantity that indicates an influence, on the respective directional microphone signal, by the associated direction-dependent sensitivity distribution; and comparing the respective quantities of the respective directional microphone signals with each other to identify a quantity having an extreme value, and determining the direction of incidence of said incoming audio signal as being the direction at which the minimum of the direction-dependent sensitivity distribution for the directional microphone signal having said extreme value is located.

2. A method as claimed in claim 1 comprising employing energy in the respective directional microphone signals as said quantity, and determining the direction of the minimum of the direction-dependent sensitivity distribution having the least energy as being said direction of incidence.

3. A method as claimed in claim 1 comprising employing a reciprocal of energy of the respective directional microphone signals as said quantity, said reciprocal of said energy representing a probability that the direction of the minimum of the direction-dependent sensitivity distribution of the directional microphone signal associated with the reciprocal is said direction of incidence.

4. A method as claimed in claim 3 comprising combining the respective probabilities of the directional microphone signals to form a direction-resolved probability distribution, and determining the direction of incidence of said incoming audio signal from said probability distribution.

5. A method as claimed in claim 1 comprising setting the respective weightings to minimize the sensitivity of the directional microphone system for a signal source located in a selected direction with respect to the directional microphone system.

6. A method as claimed in claim 1 comprising selecting said weighting to embody an effect of an acoustic environment in which said directional microphone system is being used.

7. A method as claimed in claim 6 comprising determining the respective weightings by measuring the sensitivity of the directional microphone system at a head or a head simulation.

8. A method as claimed in claim 1 wherein each of said microphone signals has an amplitude and a phase, and comprising employing a weighting having an amplitude factor and a phase factor for correcting at least one of the amplitude or the phase of at least one of said microphone signals.

9. A method as claimed in claim 1 comprising storing said weighting as a frequency-dependent characteristic.

10. A method as claimed in claim 1 comprising reading the respective weightings from a memory.

11. A method as claimed in claim 1 comprising generating said directional microphone signals substantially simultaneously.

12. A method as claimed in claim 1 comprising varying the respective weightings for two or more of said directional microphone signals to successively produce respective directional microphone signals having direction-dependent sensitivity distributions.

13. A method as claimed in claim 1 wherein each of said microphone signals has a frequency range, and comprising subdividing each frequency range into a plurality of frequency bands, each having a microphone signal component therein, and using said microphone signal components as said microphone signals.

14. A method as claimed in claim 13 comprising assessing the respective quantities of the respective directional microphone signals in at least two of said frequency bands.

15. A method as claimed in claim 1 comprising weighting the respective microphone signals from the microphones in said directional microphone system in pairs to produce said directional microphone signal.

16. A method as claimed in claim 1 wherein said incoming audio signal is a first incoming audio signal from a first source, and comprising detecting a second incoming audio signal from a second signal source with said microphones in said directional microphone system, and determining the direction of incidence of said second incoming audio signal from said quantity.

17. A method as claimed in claim 16 comprising assessing said quantities for said first and second incoming audio signals in a same frequency band by correlation.

18. A method as claimed in claim 17 comprising assessing said first and second incoming audio signals by correlation according to an echo relationship.

19. A method as claimed in claim 16 comprising assessing said quantities for said first and second incoming audio signals in respectively different frequency bands by correlation.

20. A method as claimed in claim 19 comprising assessing said first and second incoming audio signals by correlation according to an echo relationship.

21. A method as claimed in claim 1 comprising experimentally determining the direction of the minimum of each direction-dependent sensitivity distribution using an experimental signal source with said directional microphone system.

22. A method as claimed in claim 1 comprising determining the direction of the minimum of the direction-dependent sensitivity distribution by calculation with measured transfer functions.

23. An apparatus for determining a direction of incidence of an incoming audio signal comprising:

a directional microphone system having at least two microphones for detecting said incoming audio signal, each of said at least two microphones generating a microphone signal therefrom;

a phase-shifter that phase-shifts at least one microphone signal of said system relative to another microphone signal of said system;

weighting units for respectively weighting said phase-shifted microphone signals for producing at least two directional microphone signals, the respective weightings defining a direction-dependent sensitivity distribution for each of said directional microphone signals;

an assessment unit for assessing the respective directional microphone signals with respect to a quantity representing an influence of the direction-dependent sensitivity distribution on the directional microphone signal; and a determination unit that identifies one of said directional microphone signals having an extreme value of said quantity compared to the other directional microphone signals, and for determining the direction of incidence of said incoming audio signal as being a direction in which a minimum of the direction-dependent sensitivity distribution of said one of said directional microphone signals is located.

24. An apparatus as claimed in claim 23 comprising, for each of said microphones, a filter bank connected thereto for subdividing the microphone signal from the microphone signal connected thereto into a plurality of frequency bands each frequency band having an output at which a signal component of the microphone signal in that frequency band is present, with respective outputs of the respective filter banks in the same frequency band being connected in pairs to said weighting unit, said weighting unit comprising at least one of an amplitude unit for varying an amplitude of the signal component and a phase unit for shifting the phase of the signal component.

25. An apparatus as claimed in claim 24 wherein said weighting unit comprises both said amplitude units and said phase units, and wherein said amplitude units and said phase unit operate jointly on each signal component.

26. An apparatus as claimed in claim 24 wherein said assessment unit comprises a plurality of assessment subunits respectively operating in different ones of said frequency bands for assessing said quantity in the different frequency bands, and an analysis unit connected to said assessment subunits for generating, from the assessment of the quantities in the respectively different frequency bands, an acoustic environment analysis result.

27. An apparatus as claimed in claim 26 wherein said analysis result generates said acoustic environment analysis result by a correlation analysis of a time response in the different frequency bands.

* * * * *